United States Patent [19]

Ahmed

[11] Patent Number: 4,799,962

[45] Date of Patent: Jan. 24, 1989

[54] WATER-SOLUBLE POLYMER DISPERSION

[75] Inventor: Syed M. Ahmed, Wilmington, Del.

[73] Assignee: Aqualon Company, Wilmington, Del.

[21] Appl. No.: 137,841

[22] Filed: Dec. 24, 1987

[51] Int. Cl.$^4$ ............................................. C08N 1/08
[52] U.S. Cl. .................... 106/188; 106/208; 524/44; 524/45; 524/377
[58] Field of Search .............. 106/188, 208; 524/44, 524/45, 377

[56] References Cited

U.S. PATENT DOCUMENTS

| | | | |
|---|---|---|---|
| 3,160,985 | 12/1964 | Ferguson et al. | 524/377 |
| 3,220,917 | 11/1965 | Lowes | 524/377 |
| 3,485,651 | 12/1969 | Ganz | 106/213 |
| 3,661,633 | 5/1972 | Moren | 524/377 |
| 3,839,500 | 10/1974 | Dexter | 524/377 |
| 3,894,879 | 7/1975 | Colegrove | 106/189 |
| 3,894,880 | 7/1975 | Colegrove | 106/208 |
| 3,899,439 | 8/1975 | Mahlman | 106/198 |
| 4,010,135 | 3/1977 | Tutein | 524/377 |
| 4,176,107 | 11/1979 | Buckman et al. | 524/377 |
| 4,213,887 | 7/1980 | Walls et al. | 524/377 |
| 4,246,843 | 1/1981 | Garrett | 524/377 |
| 4,248,754 | 2/1981 | Fox et al. | 524/377 |
| 4,254,003 | 3/1981 | Fox et al. | 524/377 |
| 4,312,675 | 1/1982 | Pickens et al. | 106/188 |
| 4,325,861 | 4/1982 | Braun et al. | 106/191 |
| 4,330,414 | 5/1982 | Hoover | 252/8.5 A |
| 4,453,979 | 6/1984 | De Masi et al. | 106/189 |
| 4,474,919 | 10/1984 | Lobos et al. | 524/377 |
| 4,476,271 | 10/1984 | Kano et al. | 524/377 |
| 4,492,780 | 1/1985 | Zimmerschied et al. | 524/44 |
| 4,499,214 | 2/1985 | Sortwell | 106/208 |
| 4,501,828 | 2/1985 | Hadermann | 106/208 |
| 4,600,404 | 7/1986 | Sheldon et al. | 524/377 |

FOREIGN PATENT DOCUMENTS

| | | | |
|---|---|---|---|
| 0483527 | 4/1976 | Australia | 524/377 |
| 0039128 | 4/1981 | European Pat. Off. | |
| 0140223 | 5/1985 | European Pat. Off. | 524/377 |
| 0009084 | 3/1974 | Japan | 106/188 |
| 0016593 | 2/1979 | Japan | 524/377 |
| 0065766 | 4/1982 | Japan | 524/377 |
| 2027484 | 2/1987 | Japan | 524/377 |

*Primary Examiner*—Edward J. Smith
*Assistant Examiner*—J. M. Reddick
*Attorney, Agent, or Firm*—Mark D. Kuller

[57] ABSTRACT

A particulate water-soluble polymer is dispersed in a liquid medium comprised of low molecular weight polyethylene glycol, water and high molecular weight polyethylene glycol in amounts sufficient to impart stability to the dispersion. The dispersion is used in a process for dispersing the water-soluble polymer into aqueous solutions, such as latex paints, comprising preparing the dispersion and feeding the dispersion into the aqueous solution. The dispersion has excellent dispersion stability and fluidity, and is easier to handle and has a higher dissolution rate than the dry powder (particulate) form of the water-soluble polymer.

14 Claims, No Drawings

WATER-SOLUBLE POLYMER DISPERSION

This invention relates to a new type of water-soluble polymer (WSP) dispersion. It also relates to dispersing particulate water-soluble polymers (WSPs) in low-molecular weight polyethylene glycol (LW-PEG) with water and high-molecular weight polyethylene glycol (HW-PEG). The dispersion has excellent dispersion stability and fluidity, and is easier to handle and the dispersed WSP has a higher dissolution rate than the dry powder form of the same polymer.

WSPs are used, among other things, to modify rheological properties of aqueous solutions. For instance, they are used as thickeners for latex paints, well servicing fluids, cosmetics, personal hygiene products, food products, etc.; as stabilizers for emulsion and suspension polymerization, etc.; etc., and are presently in great demand.

WSPs available in solution or dispersion (emulsion) form have several handling advantages over those in the dry powder (particulate) form. Among these advantages are ease in handling and in the case of dispersions, higher dissolution rates. Synthetic WSPs based on liquid or gaseous monomers can easily be prepared in a variety of liquid forms, such as by solution and dispersion polymerization. On the other hand, WSPs derived from natural starting materials, such as cellulose derivatives, cannot be prepared in liquid form as the starting raw materials are themselves solid polymers. These polymers have been known to lump excessively when added to water, resulting in slow dissolution rates. Special care must be taken when adding WSPs to water, to avoid lumping and gel formation which result in very slow dissolution rates. Often unacceptable gel levels remain in these solutions. For these reasons there has been a desire to develop liquid WSP products by dispersing particulate WSPs in immiscible liquids.

A number of methods are disclosed for dispersing WSPs, generally, directed to use of vehicles such as liquid propylene glycol polymers, lower alcohols or lower alcohol-water mixtures, glycols, ketones. See, e.g., U.S. Pat. Nos. 4,325,861 (Braun et al), 4,312,675 (Pickens et al), 3,894,879 (Colegrove), 3,894,880 (Colegrove), 3,899,439 (Mahlman), 3,485,651 (Ganz) and 4,330,414 (Hoover), and European Patent Specification No. 39,128 (Reid).

U.S. Pat. No. 4,453,979 (DeMasi et al) is directed to a process for reducing lumping of hydrophilic gums, such as sodium carboxymethyl cellulose (CMC) when dispersing the same into formulations containing water. The method comprises (a) preparing a blend of water and an effective amount of a water-miscible alcohol represented by a formula which is inclusive of polyethylene glycol; (b) introducing the hydrophilic gum into the aqueous alcohol blend; (c) intimately mixing the resultant slurry; and (d) feeding the slurry into a water-containing formulation. This technique is not suitable for stably dispersing most WSPs over periods of time.

This invention is based on the discovery that certain particulate WSPs may be stably dispersed in low-molecular weight polyethylene glycol (LW-PEG), water and high molecular weight polyethylene glycol (HW-PEG), all in amounts that impart stability to the dispersion.

This invention is directed to use of water-in-water emulsion technology wherein the "dispersion" is comprised of two phases, a dispersion medium ("vehicle"), comprising the LW-PEG and water, and a dispersed phase, comprising the WSP and water. HW-PEG is also required in the dispersion, although the specific manner in which it is distributed is not known. Thus, for the purposes of this invention, the term "dispersion" is used to describe any mixture containing the four components (and any other components used) which is suitable for achieving the purposes of this invention, i.e., providing a vehicle containing WSP or WSPs that can be used in applications where dry (particulate) WSPs, liquid WSPs, etc., are conventionally used. Thus, the term "dispersion" is used herein to refer to what might also be termed an "emulsion", "slurry" or "sol".

By "stable" dispersion, "stably" dispersed, etc., it is meant that the composition does not immediately separate into two or more distinct layers when standing. In some instances, where the dispersion will be used within a short period of time, it is sufficient that the dispersions be moderately stable, i.e., at least sufficiently stable so that the polymer remains dispersed or may be readily redispersed after standing for a short period of time. However, dispersed WSPs tend to agglomerate, upon settling, into gels or solids which cannot readily redisperse after standing for more than a few days (or, in some cases, much shorter periods of time). Therefore, it is often preferred that the dispersions be storage stable over much longer periods of time since they will frequently be used in applications where they must be stored for periods of one to six months.

Polyethylene glycol, also called "polyoxyethylene", "poly(ethylene oxide)" or "polyglycol", is a well known condensation polymer of ethylene glycol having the formula $HOCH_2CH_2$—$(OCH_2CH_2$—$)_n$—$OCH_2CH_2$—$OH$ or $H(OCH_2CH_2)_nOH$. Polyethylene glycol and methoxy polyethylene glycol are commercially available in various grades, e.g., under the trademark "Carbowax" (trademark of Union Carbide Company).

By "low molecular weight polyethylene glycol vehicle" is meant that the vehicle for dispersion of the cellulosic water-soluble polymer comprises one or more low molecular weight polyethylene glycol compounds. Typically such low molecular weight polyethylene glycols are substituted or unsubstituted, have a molecular weight of about 200 to about 700, preferably 250 to 500, and are liquid at room temperatures. The preferred low molecular weight polyethylene glycols used in the present invention are unsubstituted or substituted with a methoxy group.

By "high molecular weight polyethylene glycol" it is meant that the dispersion of this invention may comprise one or more high molecular weight polyethylene glycol compounds. High molecular weight polyethylene glycol compounds useful in this invention are solid at room temperature, preferably in the form of a flake or powder, which may be readily dissolved. Typically, such polyethylene glycols are substituted or unsubstituted and have a molecular weight greater than about 3,000, preferably of about 3,000 to about 50,000, and most preferably of about 10,000 to about 30,000. The preferred high molecular weight polyethylene glycols are unsubstituted or substituted with a methoxy group.

Polyethylene glycol is commonly identified by its molecular weight (MW) and the type of substituents in combination with the initials "PEG". Thus, polyethylene glycol with a molecular weight of 350 which is substituted with a methoxy group may be referred to as "methoxy PEG 350". This terminology is used, in some instances, below.

The method of this invention can be used to disperse any particulate water-soluble polymer which is not readily soluble (is substantially insoluble) in the LW-PEG, including synthetic polymers such as polyvinylpyrrolidone and its derivatives, natural gums (polysaccharides) such as guar gum and its derivatives, and water-soluble cellulose derivatives such as carboxymethyl cellulose. The polymer must not be readily soluble in the LW-PEG because if too much of the polymer dissolves in the LW-PEG, the liquid will become too viscous, in some instances forming a liquid or solid gel which will not be suitable for the purposes of this invention. Examples of water-soluble cellulose derivatives that can be dispersed by the method of this invention include hydroxyethyl cellulose (HEC), carboxymethyl hydroxyethyl cellulose (CMHEC), hydrophobically modified hydroxyethyl cellulose (HMHEC), sodium carboxymethyl cellulose (CMC), ethyl hydroxyethyl cellulose, methyl cellulose and hydroxypropyl methyl cellulose, etc. Dispersable synthetic polymers include polyvinylpyrrolidone, polyacrylamide, and their derivatives, etc. Guar, hydroxypropyl guar, xanthan, gum tragacanth, gum karaya, gum arabic, tara gum, and other similar polysaccharides can also be dispersed with this invention.

The dispersions of this invention can be prepared by admixing the components in a batch or continuous manner. For example, in a preferred method, the water-soluble polymer is added to the LW-PEG, followed by addition of an aqueous solution of the HW-PEG, all steps being carried out with agitation. The resultant dispersion may be stored and added, or directly added, to any aqueous formulation requiring WSP where the end use will tolerate the presence of PEG.

It is desirable that the dispersion contain a ratio of water-soluble polymer to low molecular weight polyethylene glycol (polymer:vehicle ratio) such that the dispersion can be readily used in commercial applications. However, concentrated dispersions may be preferable where the dispersion will be stored over long periods of time or transported. The specific amounts used will depend on the insolubility of the specific water-soluble polymer in the LW-PEG used, as well as the effect of water and HW-PEG.

Sufficient LW-PEG should be used so that the dispersion has suitable fluidity for its intended use. Higher concentrations of WSP are preferred as they are less expensive to transport and store. Dispersions generally contain LW-PEG and WSP in a weight ratio of WSP:LW-PEG of about 1:100 to about 1:1, preferably 1:5 to 1:2.

The stability of the dispersion of this invention also depends on the amount of HW-PEG and water. The amount of water used should be such that a stable dispersion is formed, but should not be so great the polymer swells and a gel is formed. Moreover, the stability of the dispersions of this invention tends to be extremely sensitive to the amount of water used and, therefore, each dispersion tends to be stable only when specific amounts of water are used. Water is generally used in an amount such that the weight ratio of WSP:water is about 15:1 to about 1:3, preferably 10:1 to 1:1.5.

Preferably HW-PEG is added in the form of an aqueous solution. The amount of HW-PEG added should be sufficient so that a stable dispersion is obtained. Small amounts are sufficient to impart stability. HW-PEG is generally used in a weight ratio of WSP:HW-PEG of about 5:1 to about 20:1, preferably 10:1 to 15:1.

The stability of individual dispersions can be readily determined by those of ordinary skill in the art by simple test tube experiments. For example, water-soluble polymers may be mixed with LW-PEG to determine their compatibility. Then, if the polymer is found to be sufficiently insoluble in the LW-PEG, water and HW-PEG, aqueous solutions of HW-PEG, or combinations thereof are added to the slurry. By repeating the procedure using various components and amounts, followed by testing on a larger scale, the specific combination that will provide the desired stability and fluidity can be determined. For instance, a composition comprising 20% medium viscosity CMC (ca. 0.7 degree of substitution, medium viscosity, i.e., 400-800 cps Brookfield Viscosity in a 2% solution), 48% PEG 200, 29% water and 3% PEG 20,000, all based on the total weight of the dispersions, forms a gel; whereas, a similar composition containing PEG 300 or PEG 400 instead of PEG 200 forms a stable dispersion (stable as prepared).

The present invention will be illustrated in the following examples, which are not intended to be limiting. In the examples all percentages, parts, etc., are by weight unless otherwise noted.

EXAMPLE 1

The following example shows the effect of adding water or water containing HW-PEG to a dispersion of CMC in a LW-PEG vehicle.

A mixture of PEG 300 and CMC (CMC 7M, available from the Aqualon Company, Wilmington, Delaware, having a Brookfield viscosity of about 400-800 cps in a 2 wt % solution at 25° C.) was prepared and found to be unstable. Subsequently, in separate runs, water and water containing small amounts of PEG 20,000 were prepared. Results are shown in the following Table 1. Only the dispersion containing HW-PEG was stable.

TABLE 1

Dispersions of CMC
Effect of Added Water And High Molecular Weight Polyethylene Glycol

| | Composition (wt. %) | | | | Properties Of The Resulting Dispersions | | |
| | | | | | Stability | | Brookfield Viscosity* (cps.) |
| Sample | CMC | PEG 300 | $H_2O$ | PEG 20,000 | As Made | After 24 Hrs. | 12 rpm | 60 rpm |
|---|---|---|---|---|---|---|---|---|
| 1 | 20 | 80 | — | — | Unstable | — | — | — |
| 2 | 23 | 44 | 33 | — | Gel | — | — | — |
| 3 | 20 | 48 | 29 | 3 | Stable | Stable | 16,000 | 9,000 |

*Spindle #4

EXAMPLE 2

This example shows that the polymer must be substantially insoluble in the LW-PEG used for stable dispersion.

Mixtures of the CMC used in Example 1 and LW-PEG were prepared to determine their solubility. CMC was found to be soluble up to 20 wt. % with PEG 200, but substantially insoluble in PEG 300 and PEG 400. The blends of the latter two mixtures quickly separated into two distinct layers upon standing. Addition of water containing a small amount of PEG 20,000 increased the stability of the PEG 300 and PEG 400 dispersions, whereas the PEG 200 composition formed a gel. Results obtained with water and PEG 20,000 are shown in Table 2 below.

TABLE 2

Dispersions Of CMC
Effect Of Low Molecular Weight Polyethylene Glycol

| | | Composition (wt. %) | | | | Properties Of The Resulting Dispersions | | | |
| | | | | | | Stability | | Brookfield Viscosity | |
| | PEG | | | | PEG | | After | (cps.) | |
| Sample | MW | CMC | PEG | $H_2O$ | 20,000 | As Made | 24 Hrs. | 12 rpm | 60 rpm |
| 4 | 200 | 20 | 48 | 29 | 3 | Gel | — | — | — |
| 3[1] | 300 | 20 | 48 | 29 | 3 | Stable | Stable | 16,000[2] | 9,000[2] |
| 5 | 400 | 20 | 48 | 29 | 3 | Stable | Slow Phase Separation | 1,500[3] | 1,100[3] |

[1] Also shown in Table 1.
[2] Spindle #4.
[3] Spindle #3.

The data in Table 2 show that the polymer to be dispersed must be substantially insoluble in the LW-PEG used for stable dispersion.

EXAMPLE 3

This example shows the preparation of dispersions containing various amounts of PEG 400, CMC, water and PEG 20,000.

Dispersions of the CMC used in Example 1 in PEG 400 were prepared as in example 2, except that the weights of the components were varied as shown in Table 3 below. Results obtained are shown in Table 3 below.

TABLE 3

Dispersions Of CMC
Effect Of CMC Concentration

| | | | | | Properties Of The Resulting Dispersions | | | |
| | | Composition (wt. %) | | | Stability | | Brookfield Viscosity | |
| | | PEG | | PEG | | After | (cps.) | |
| Sample | CMC | 400 | $H_2O$ | 20,000 | As Made | 24 Hrs. | 12 rpm | 60 rpm |
| 6 | 23 | 40.7 | 33 | 3.3 | Stable | Unstable | 7,000[1] | 4,200[1] |
| 7 | 21.5 | 44.5 | 31 | 3.0 | Stable | Unstable | 4,300[2] | 2,700[1] |
| 5[2] | 20 | 48.0 | 29 | 3.0 | Stable | Unstable[3] | 1,500[4] | 1,100[4] |
| 8 | 20 | 46.5 | 29 | 4.5 | Stable | Unstable | 1,500[4] | 1,000[4] |

[1] Spindle #4.
[2] Previously shown in Table 2.
[3] Slow phase separation.
[4] Spindle #3.

CMC dispersioned with PEG 400 was stable, as made, but was not stable after 24 hours. Slow phase separation occurred after 24 hours with sample 5.

EXAMPLE 4

The following example shows the effect of adding water, and water containing high molecular weight polyethylene glycol to a dispersion containing CMHEC and a low molecular weight polyethylene glycol.

CMHEC 420H (available from the Aqualon Company, Wilmington, Delaware, having a Brookfield LVF viscosity in a 1 wt. % aqueous solution of 1,500 to 2,500 cps at 30 rpm with a #3 spindle) was mixed with PEG 200, 300, and 400 and found to be soluble, to varied extents, as evidenced by gradual increases in viscosities of the blends. CMHEC 420H, on the other hand, showed complete insolubility with Methoxy PEG 50, forming a somewhat stable dispersion on its own. Samples 9 to 13 were prepared using the methods of Example 2, except that the components shown in Table 4 below were used. Results obtained are shown in Table 4 below.

TABLE 4

Dispersions Of CMHEC

| | | Composition (wt. %) | | | Properties Of The Resulting Dispersions | | | |
| | | Methoxy | | | Stability | | Brookfield Viscosity | |
| | | PEG | | PEG | | After | (cps.) | |
| Sample | CMHEC | 350 | $H_2O$ | 20,000 | As Made | 24 Hrs. | 12 rpm | 60 rpm |
| 9 | 36.8 | 63.2 | 0 | 0 | Stable | Unstable | 330[1] | 300[1] |
| 10 | 29.2 | 50.0 | 20.8 | 0 | Gel | — | — | — |
| 11 | 28.0 | 48.0 | 20.0 | 4.0 | Stable | Gel | 4,250[2] | 2,620[2] |
| 12 | 29.2 | 60.4 | 8.7 | 1.7 | Stable | Stable[3] | 5,450[1] | 2,050[2] |
| 13 | 31.1 | 64.5 | 3.7 | 0.7 | Stable | Slight phase | — | — |

TABLE 4-continued

| | | Dispersions Of CMHEC | | | | | |
|---|---|---|---|---|---|---|---|
| | Composition (wt. %) | | | Properties Of The Resulting Dispersions | | | |
| | | Methoxy | | | Stability | Brookfield Viscosity | |
| | | PEG | | PEG | After | (cps.) | |
| Sample | CMHEC | 350 | H₂O | 20,000 | As Made  24 Hrs. | 12 rpm | 60 rpm |
| | | | | | separation⁴ | | |

¹Spindle #2.
²Spindle #4.
³No phase separation after 6 months.
⁴Readily redispersible even after 1 month.

Table 4 shows that due to the insolubility of, CMHEC 420H in methoxy PEG 350 a somewhat stable dispersion results when they are mixed. Addition of water and PEG 20,000 in proper amounts (Samples 12 and 13) produces a much more stable dispersion, i.e., stable for periods of greater than 6 months.

The dispersions of this invention are useful in applications where dry water-soluble cellulose polymers have previously been used, as well as in applications where dry water-soluble cellulose polymers have not been well suited due to their slow dissolution rates. The dispersions are especially useful for dispersing water-soluble polymers in aqueous solutions such as, e.g., aqueous paints, well servicing fluids, cosmetics, personal hygiene products, food products, and fluids used in the preparation of polymers.

While the invention has been described with respect to specific embodiments, it should be understood that they are not intended to be limiting and that many variations and modifications are possible without departing from the scope of this invention.

What is claimed is:

1. An aqueous dispersions comprising a particulte water-soluble polyer selected from the group consisting of polyacrylamide and polyacrylamide derivatives, polyvinylpyrrolidone and polyvinylpyrrolidone derivates, guar gum and guar gum derivatives, and cellulosic polymers, a low molecular weight polyethylene glycol, water and high molecular weight polyethylene glycol, all in amounts which result in a dispersion which is stable as made.

2. The dispersion of claim 1 wherein the low molecular weight polyethylene glycol has a molecular weight in the range of from about 200 to about 700 and the high molecular weight equal to or polyethylene glycol has a molecular weight equal to or greater than about 3,000.

3. The dispersion of claim 2 wherein the high molecular weight polyethylene glycol has a molecular weight in the range of from about 3,000 to about 50,000.

4. The dispersion of claim 3 wherein the weight ratio of water soluble polymer:low molecular weight polyethylene glycol is about 1:100 to about 1:1, the weight ratio of water soluble polymer:water is about 15:1 to about 1:3, and the weight ratio of water soluble polymer:high molecular weight polyethylene glycol is about 5:1 to about 20:1.

5. The dispersion of claim 4 wherein the water-soluble polymer is substantially insoluble in the low molecular weight polyethylene glycol.

6. The dispersion of claim 5 wherein the water-soluble polymer is a particulate cellulosic water-soluble polymer selected from the group consisting of sodium carboxymethyl cellulose, ethyl hydroxyethyl cellulose, hydroxyethyl cellulose, carboxymethyl hydroxyethyl cellulose, hydrophobically modified hydroxyethyl cellulose, methyl cellulose and hydroxypropyl methyl cellulose.

7. The dispersion of claim 5 where the water soluble polymer is selected from the group consisting of guar, hydroxypropyl guar, xanthan, gum tragacanth, gum karaya, gum arabic and tara gum.

8. The dispersion of claim 5 wherein the cellulosic water-soluble polymer is selected from the group consisting of sodium carboxymethyl cellulose and carboxymethyl hydroxyethyl cellulose.

9. The dispersion of claim 5 wherein the low molecular weight polyethylene glycol is unsubstituted or substituted with a methoxy group and the high molecular weight polyethylene glycol is unsubstituted or substituted with a methoxy group.

10. The dispersion of claim 8 wherein the low molecular weight polyethylene glycol is unsubstituted or substituted with a methoxy group and the high molecular weight polyethylene glycol is unsubstituted or substituted with a methoxy group.

11. The dispersion of claim 1 wherein the dispersion is stable for 24 or more hours.

12. The dispersion of claim 5 wherein the dispersion is stable for one or more months.

13. The dispersion of claim 5 wherein low molecular weight polyethylene glycol has a molecular weight in the range of 250 to 500 and the high molecular weight polyethylene glycol has a molecular weight in the range of 10,000 to 30,000.

14. The dispersion of claim 13 wherein the weight ratio of water soluble polymer:low molecular weight polyethylene glycol is 1:5 to 1:2, the weight ratio of the water soluble polymer:water is about 10:1 to 1:15, and the weight ratio of the water soluble polymer:high molecular weight polyethylene glycol is 10:1 to 15:1.

* * * * *

UNITED STATES PATENT AND TRADEMARK OFFICE
CERTIFICATE OF CORRECTION

PATENT NO. : 4,799,962
DATED : January 24, 1989
INVENTOR(S) : Syed M. Ahmed

It is certified that error appears in the above-identified patent and that said Letters Patent is hereby corrected as shown below:

Column 6, line 51 " 50 "

should read -- 350 --

Signed and Sealed this

Twenty-seventh Day of June, 1989

*Attest:*

DONALD J. QUIGG

*Attesting Officer*  *Commissioner of Patents and Trademarks*